US00RE35254E

United States Patent [19]

Chaisemartin et al.

[11] E Patent Number: Re. 35,254

[45] Reissued Date of Patent: May 28, 1996

[54] CONVERSION DEVICE FOR DOUBLING/DIVIDING THE RATE OF A SERIAL BIT STREAM

[75] Inventors: Philippe Chaisemartin, Brignoud; Sylvain Kritter, Grenoble, both of France

[73] Assignee: SGS-Microelectronics, S.A., Gentilly Cedex, France

[21] Appl. No.: 238,822

[22] Filed: May 5, 1994

Related U.S. Patent Documents

Reissue of:

[64] Patent No.: 5,111,488
Issued: May 5, 1992
Appl. No.: 637,920
Filed: Jan. 7, 1991

[30] Foreign Application Priority Data

Jan. 9, 1990 [FR] France ..... 90 00403

[51] Int. Cl.[6] ..... H04J 1/05; H03B 19/00

[52] U.S. Cl. ..... 377/47; 327/115; 327/116; 327/122; 370/84; 341/61; 377/81

[58] Field of Search ..... 377/47, 81; 370/84; 328/20; 341/61; 327/116, 115, 117, 122

[56] References Cited

U.S. PATENT DOCUMENTS

| | | | |
|---|---|---|---|
| 3,135,947 | 6/1964 | Grondin | 395/550 |
| 3,600,686 | 8/1971 | Halsall | 377/47 |
| 3,696,402 | 10/1972 | Armstrong | 341/61 |
| 3,992,612 | 11/1976 | Dunn | 377/47 |
| 4,028,666 | 6/1977 | Suzuki et al. | 295/250 |
| 4,165,539 | 8/1979 | Aichelmann | 257/238 |
| 4,317,198 | 2/1982 | Johnson | 370/84 |
| 4,366,373 | 12/1982 | Metcalf | 377/47 |
| 4,799,022 | 1/1989 | Skierszkan | 327/116 |
| 4,852,130 | 7/1989 | Draxelmayr | 377/81 |
| 4,939,722 | 7/1990 | Biechler | 370/84 |

*Primary Examiner*—John S. Heyman
*Attorney, Agent, or Firm*—Robert Groover; Betty Formby

[57] ABSTRACT

A device for doubling or dividing by 2 the flow rate of series bits comprising a succession of first one-bit registers (R4–R0) actuated at a frequency F; a second register (R) actuated at a frequency 2F; an input terminal (IN) connected to the input of the first (R4) of the first registers and, through a first gate (T5), to an internal line (L) connected to the input of the second register; first multiplexers (M4–M1) connected to the input of each second (R3) to last (R0) of the first registers for selecting either the output of the preceding register, or the internal line, or still the output of the second register; a second multiplexer (M), which selects either the output of the last (R0) of the first registers, or the output of the second register, or filling bits; second transfer gates (T4–T0) between the output of each first register and the internal line; and means for controlling the various gates and multiplexers.

17 Claims, 3 Drawing Sheets

CONVERSION DEVICE FOR DOUBLING/DIVIDING THE RATE OF A SERIAL BIT STREAM

Matter enclosed in heavy brackets [ ] appears in the original patent but forms no part of this reissue specification; matter printed in italics indicates the additions made by reissue.

BACKGROUND OF THE INVENTION

The present invention relates to a device transforming each word of a [flow of series bits] *serial bit stream* arriving at a first clock frequency into a word at a double frequency, the remaining time interval being occupied by filling bits. [Reversely,] *In its opposite mode,* the device according to the invention selects, from a flow of bits arriving at a determined frequency, half these bits and transmits them at half bit rate.

FIG. 1 shows the function to be realized by a doubler in case of 8-bits words. Considering a word $D_F$ of a flow of successive words, wherein each bit d0 . . . d7 arrives at the frequency of a clock F, it is desired to obtain a word $D_{2F}$ comprising twice as many bits, here 16, wherein bits arrive at the rate of a clock 2F. Therefore, the word $D_{2F}$ contains the bits d0–d7and filling bits r0–r7.

It is often useful to double the number of bits of a word for realizing operations with a greater accuracy. Once operations are completed, the 8 most significant bits are taken again in word $D_{2F}$ and they are transformed once more into a work $D_F$ in a dividing device.

An object of the invention is to provide a single device capable of operating either as a doubler or as a divider.

SUMMARY OF THE INVENTION

To achieve this object, the invention provides a device for doubling or dividing by 2 the rate of series bits comprising a succession of first one-bit registers actuated at a frequency F; a second register actuated at a frequency 2F; an input terminal connected to the input of the first of the first registers and, through a first gate, to an internal line connected to the input of the second register; first multiplexers connected to the input of each second to last first register for selecting the output of the preceding register, the internal line, or the output of the second register; a second multiplexer, the output of which corresponds to the device output and which selects either the output of the last of the first registers, or the output of the first register, or filling bits; second transfer gates between the output of each first register and the internal line; and means for controlling the various gates and multiplexers.

In a doubling operation, the first gate is inhibited and the input is permanently applied to the first of the first registers; each first multiplexer is designed to permanently connect the output of each first register to the next first register; the output multiplexer is controlled for alternatively supplying a succession of filling bits during the first half period of the transmission time duration of a word, then the succession of the second register outputs; and each second transfer gate is actuated so that the last gate is first rendered conductive once, the next gates rendered conductive twice, successively, and the last gate rendered conductive once.

In a dividing operation, the first gate is enabled for constantly connecting the input terminal to the register input at a double frequency; the second gates are inhibited; the output of the last of the first registers is constantly connected through the output multiplexer to the output terminal; and the first multiplexers are sequentially controlled to send either of their inputs, in a predetermined order, to each first register.

BRIEF DESCRIPTION OF THE DRAWINGS

The foregoing and other objects, features and advantages of the invention will be apparent from the following detailed description of preferred embodiments as illustrated in the accompanying drawings wherein.

In the following description, a device processing 8-bits words will be considered. It is clear that the invention more generally applies whatever the number of bits of the words to be processed.

DETAILED DESCRIPTION OF THE INVENTION

Figure 2:
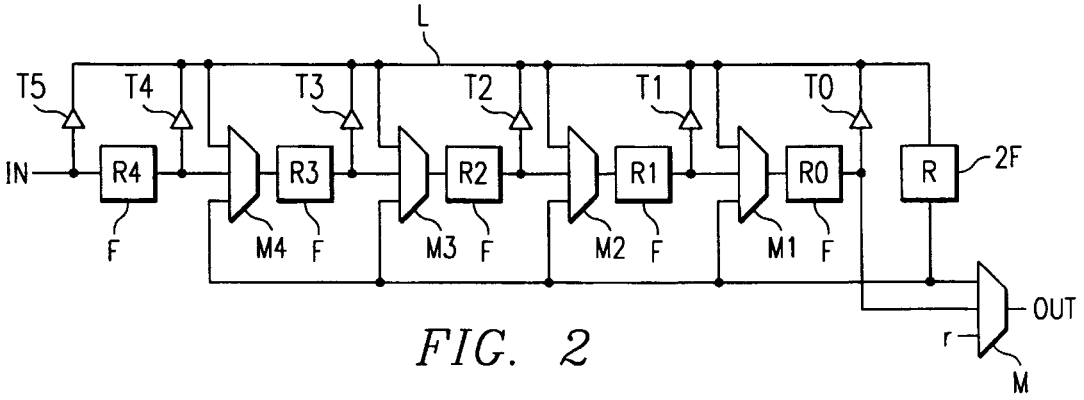
FIG. 2 schematically shows an embodiment of a device according to the invention.

FIG. 2 shows the general diagram of a device according to the invention. This device comprises 5 registers R4–R0 operating at the frequency F and a register R operating at the frequency 2F. Register R4 is connected to the input terminal IN of the circuit. Registers R3, R2, R1 and R0 are connected to the output of multiplexers M4, M3, M2 and M1 which permit selecting one of three inputs, namely an internal line L, or the output of the preceding register, or [still] the output of register R. The internal line L is connected to the input of register R and can receive an input either from the terminal IN through a gate T5 or the output of one of registers R4–R0 through gates T4–T0. A multiplexer M supplies at the circuit output either the output of register R, or the output of register R0, or [still] filling bits r.

Gates T0–T5 are in fact [3 states]*3 -state* buffers, that is, devices capable of supplying at their output (to the internal line L) either a buffered reproduction of the input signal, or an [ON] *OFF* -state according to an enabling signal.

DOUBLER

Figure 3:
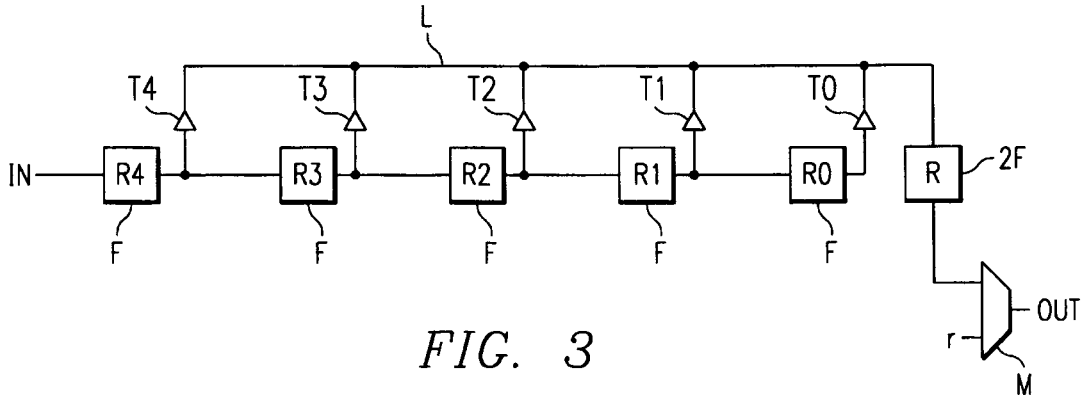
FIG. 3 shows the device of FIG. 2 operating as a doubler.

The operation of this circuit as a doubler will be explained in relation with FIGS. 3 and 5. FIG. 3 is the same as FIG. 2 except that the gates which are constantly closed are replaced by simple shortings and the gates which are constantly open are suppressed. Similarly, the multiplexers which are always directed to the same input are replaced by shortings.

In the arrangement of FIG. 3, multiplexers M1–M4 continuously select the output of the register which precedes them, that is, data successively pass into registers R4–R0 which form a conventional shift register, and gate T5 is constantly inhibited.

The way a data word comprising bits d0–d7 is transformed by the circuit of FIG. 3 will now be considered. In FIG. 5, t1, t2, t3 . . . designate successive times corresponding to clock periods at frequency 2F. Referring to a given time in fact relates to the clock period 2F following this time.

At time t1, the first bit d0 arrives on input IN. At time t3, it is placed into register R4.

At time t4, multiplexer M is connected on its filling bit input and successive filling bits, for example 0s, are supplied to the output OUT. Then, the input bits are regularly shifted in registers R4–R0 at the rate of clock F.

Therefore, at time t11, registers R4–R0 contain bits d4–d0 respectively. For this time, transfers are made from low speed registers R4–R0 towards register R and the output OUT of multiplexer M. At time t11, gate TO is closed and the content d0 of register RO is transferred towards the internal line L and the double frequency register R. Simultaneously, multiplexer M is controlled for routing the output of register R towards terminal OUT. At time T12, transfer gate t1 is closed and the content of register R1 is transferred towards line L. At time t13, register R1 receives datum d2 which is immediately transferred through a new closing of gate T1 towards line L, register R and the output.

Figure 1:
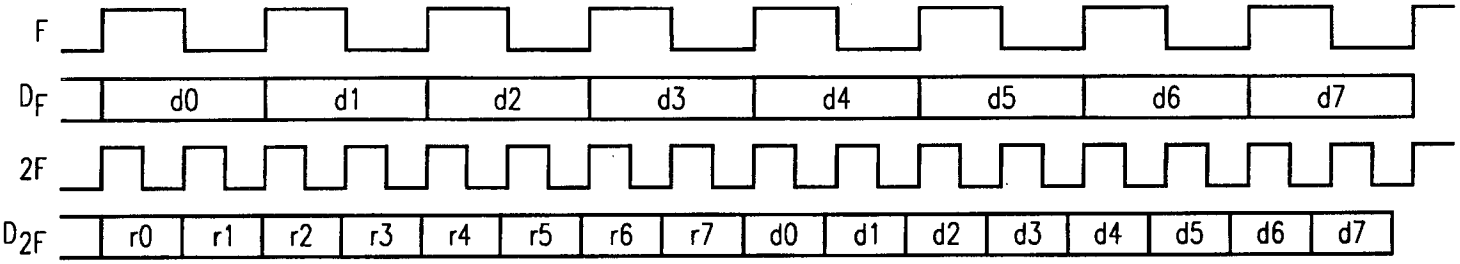
FIG. 1, already described, shows the function that the device according to the invention aims to achieve.
Figure 5:
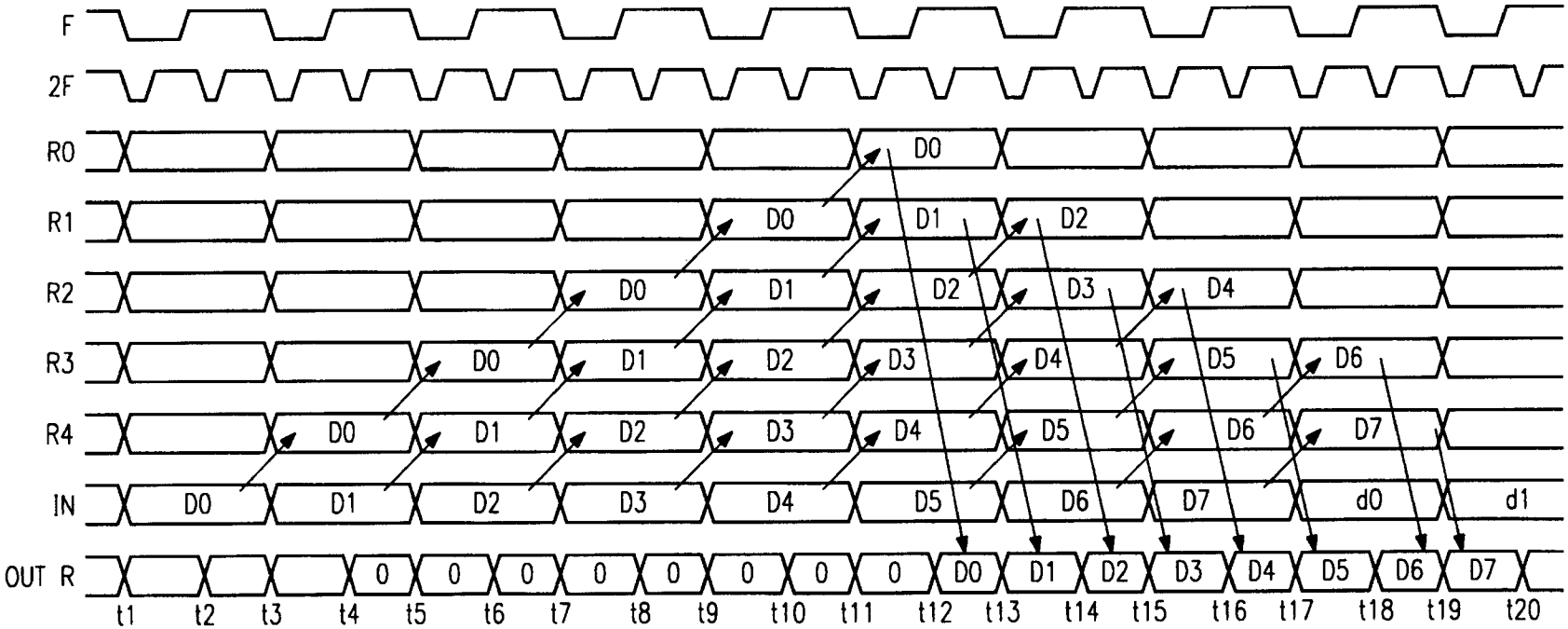
FIGS. 5 and 6 are timing diagrams designated to explain the operation of the device according to the invention, operating as a doubler and as a divider, respectively.

Thus, transfer gates T0, T1 and T1, are sequentially closed as indicated, then transfer gates T2, T2, T3, T3 and T4 and, as shown in FIG. 5, at times t18, bit d7 is transferred towards the output. It will be noted that from time t19, register R4 receives the first bit of the next word which has arrived on input IN at time t17.

In the above example, the filling bits were sytematically 0s. It is also possible to systematically use 1s or extend the bit sign, that is, to repeat over the whole time duration of the filling bits the sign bit which generally is, when it is provided, the most significant bit of a data word. It will also be possible to insert a predetermined word or a word from another flow of data.

On the other hand, in the example shown in FIG. 5, filling bits are provided before the data bits word. Since the device *operates*, sequentially [operates], it is possible to conversely provide in the double frequency word, firstly data bits, then filling bits.

DIVIDER

Figure 4:
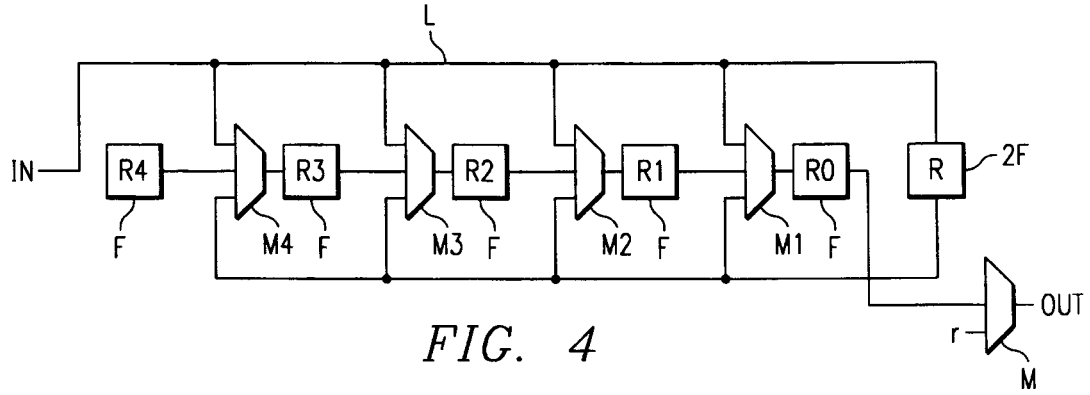
FIG. 4 shows the device of FIG. 2 operating as a divider.
Figure 6:
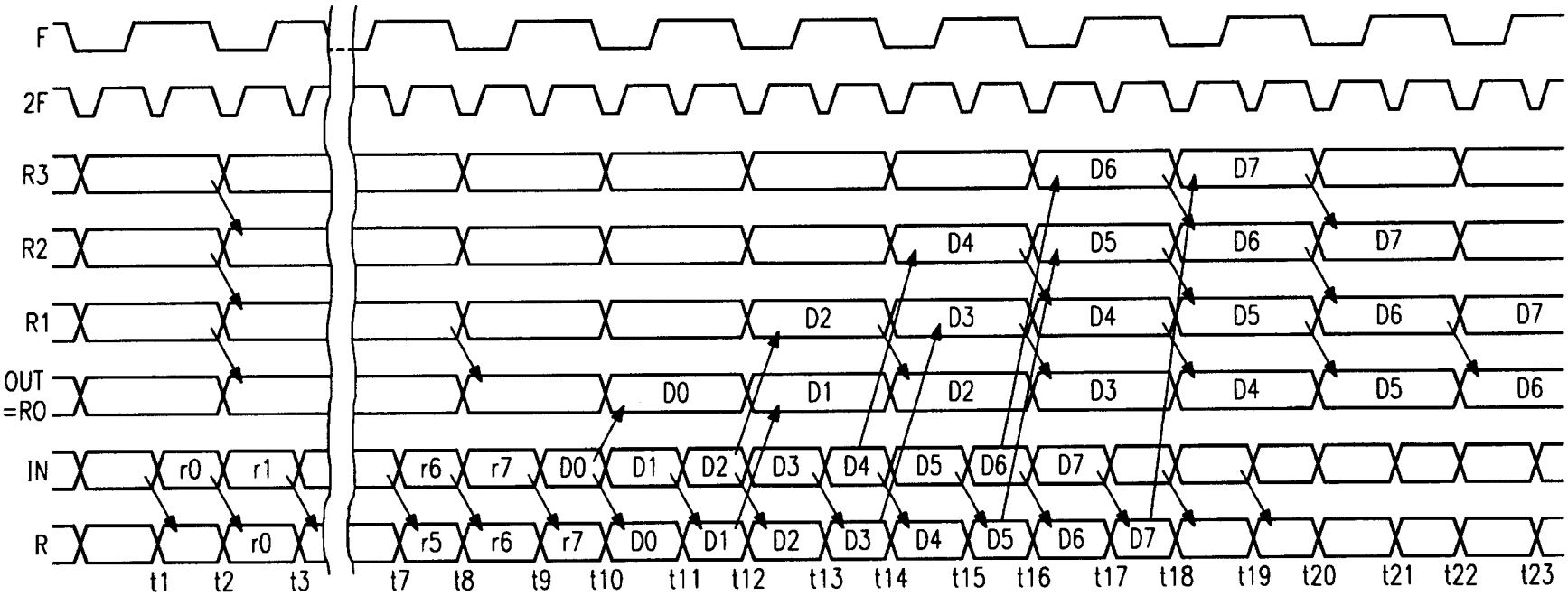

FIGS. 4 and 6 illustrate the case when the device according to the invention is used as a divider by 2 of the bit rate.

In that case, gate T5 always operates as an amplifier, and gates T0–T4 are always open. Thus, input IN is constantly applied to register R. Register R4 does not operate. The output of register R can be selectively connected to the input of one out of registers R3–R0, as well as to the internal line L, registers R2–R0 being beside capable of receiving the output of the preceding register. Multiplexer M supplies on the output terminal OUT the output of register R0. With this circuit, it can be seen that it is possible to introduce into each register R2–R0 the content of the preceding register, or the output of register R, or [still] the content of the internal line L by properly selecting multiplexers M4–M1.

Considering that the 16-bits input word at frequency 2F first comprises successivly bits r0–r7 that are to be discarded, then bits D0–D7 that are to be transmitted at half the frequency [,] rate one blocks firstly, between times t0 and t9, the transmission between the output of register R and registers R3–R0 and the outputs of register R are lost.

When, at time t9, bit d0 arrives on the input IN, it is directly transmitted through multiplexer M1 of the internal line L to register R0 and supplied at the output.

At time t10, bit D1 arrives and is supplied to register R.

At time t11, bit D1 arrives and is directly transmitted to register R1 through multiplexer M2 while bit D1 contained in register R is transmitted to register R0 and is supplied at the output.

At time t12, bit D3 arrives and is supplied to register R.

At time t13, but D4 arrives. It is sent to register R and to register R2 through multiplexer M3, while bit D3 contained in register R is sent to register R1. Simultaneously, multiplexer M1 transmits the content of register R1 to register R0 and therefrom to the output.

AT time t14, bit D5 arrives and is sent to register R.

At time t15, bit D6 arrives and is sent to register R3 through multiplexer M4 while bit D5 contained in register R is sent through multiplexer M3 to register R2 and while multiplexer M2 and M1 ensure the transmission of bit D4 contained in register R2 to register R1 and transmission of bit D3 contained in register R1 to register R0 and the output.

At time t16 arrives the last bit D7 of the word, which is transmitted to register R.

From time t17, the content of register R, D7, is sent to register R3 while the contents of registers R3, R2 and R1 are shifted towards registers R2, R1 and R0. By successively shifting registers R3, R2, R1 and R0, bits D4, D5, D6, D7 are thus sequentially obtained at the output.

When considering again the described bit flow and the successive content of register R0 between times t10 and t24 on FIG. 6, it can be seen that bits D0–D7 have effectively been emitted at frequency F.

For the sake of simplicity, the case of a specific 16-bit word has been considered here. It is clear that this 16-bits word is part of a sequence of words and that operations are regularly repeated, without any dead time for each word. Arrows on FIG. 6 indicate transfers made on the preceding and next words while the considered word is being processed.

Of course, the above description is a very schematic exemplary embodiment of the invention. Those skilled in the art will be able to realize in an integrated circuit technology, for example in CMOS technology, multiplexers, transfer gates, and one-cell registers.

On the other hand, the operation of the system has been explained by indicating the sequence of the control signals which have to be applied to transfer gates and multiplexers. The implementation of a logic circuit implementing these functions and supplying these successive control signals will be simple for those skilled in the art, who will be capable of pre-storing the control sequences to be applied to the various components in a memory or a programmable logic array, in a way known per se.

Among the advantages of the invention, it can be noted that the described device exhibits the advantage to be operable either as a divider or as a doubler, according to its control [mode and that it is further] *mode. It is also* simple to implement, since it is fully modular as a function of the number of data bits.

Calculation shows that if the number of data to be doubled is equal to N, the number of registers has to be equal to 2+N/2) if N is even and to 2+[(N−1)/2]if N is odd.

We claim:

1. A device for doubling or dividing by 2 the rate of serial bits *in a serial bit stream,* comprising:

a succession of first one-bit registers [(R4–R0)] actuated at a frequency F, a second register [(R)] actuated at a frequency 2F, an input terminal (IN)] connected to the input of the first [(R4)] among said first registers and, through a first gate [(T5)], to an internal line [(L)] connected to the input of said second register, first multiplexers [(M4–M1)] respectively connected to the input of each [(R3–R0)] of said first registers for selecting either the output of the preceding register, or said internal line, or the output of said second register, a second multiplexer [(M)], the output of which corresponds to the device output and which selects either the output of the last [(R0)] among said first registers, or the output of the second register, or filling bits, second [transfer] gates [(T4–T0)] between the output of each first register and said internal line, and means for controlling the various gates and multiplexers.

2. A device according to claim 1, connected as a doubler, wherein:

said first gate [(T5)] is inhibited and the input is constantly applied to the first among said first register [(R4)] of said first registers, each first multiplexer [(M4–M1)] is designed to constantly connect the output of each first register to the following first register, said second multiplexer [(M)] is controlled for alternatively supplying a succession of filling bits during the first half period of a word transmission duration, then the succession of outputs of said second register [(R),] and each second [transfer] gate [(T4–T0)] is actuated so that the last [(T0)] among said second gates is first rendered conductive once, the following gates among said second gates rendered conductive twice, successively, and the last among said second gates reduced conductive once.

3. A device according to claim 1, connected as a divider, wherein:

said first gate [(T5)] is enabled for constantly connecting the input terminal [(IN)] to the input of said second register [(R),]

the second gates [(T4–T0)] are inhibited, the output of the last [(R0)] among the first registers is constantly connected through said second multiplexer [(M)] to the output terminal [(OUT),]

said first multiplexers [(M4–M1)] are sequentially controlled for sending either of their inputs, in a predetermined order, to each first register [(R3–R0)].

*4. A device according to claim 1, wherein each said gate is a 3-state buffer.*

*5. A device according to claim 1, for doubling the rate of 8-bit strings of data, comprising 6 of said first and second registers.*

*6. A device according to claim 1, for doubling the rate of N-bit strings of data where N is a predetermined even number, comprising 2+N/2 of said first and second registers.*

*7. A device according to claim 1, for doubling the rate of N-bit strings of data where N is a predetermined odd number, comprising* 2+(N−1)/2 of said first and second registers.

*8. A circuit for selectably doubling or halving the rate of an incoming bit stream, comprising:*

*a shift register comprising multiple stages connected to be operated at a first clock rate, and each having an input and an output; said stages of said shift register being operatively connected in series, with each pair of successive stages having a respective intermediate multiplexer interposed therebetween;*

*a plurality of gates, each connected to receive the output of a respective one of said stages, and to selectably drive said output onto a common line, said common line also being selectably connectable to receive the incoming bit stream,*

*an additional register connected to be operated at a multiple of said first clock rate, and connected to receive said common line as input, and to provide a corresponding output; and*

*an output multiplexer, connected to provide an output which is selected from among: said output of said additional register, a last one of said stages, and a constant value;*

*said intermediate multiplexers each being connected to receive as inputs said common line, said output of said additional register, and the output of one of said stages.*

*9. The circuit of claim 8, for doubling the rate of 8-bit strings of data, comprising 5 of said stages.*

*10. The circuit of claim 8, for doubling the rate of N-bit strings of data where N is a predetermined even number, comprising 1+N/2 of said stages.*

*11. The circuit of claim 8 for doubling the rate of N-bit strings of data where N is a predetermined odd number, comprising 1+(N−1)/2 of said stages.*

*12. The circuit of claim 8, wherein each said transfer gate is a 3-state buffer.*

*13. A method for using a single circuit for selectably doubling or halving the bit rate of an incoming bit stream, comprising the steps of:*

*for doubling the bit rate:*

*connecting the incoming signal to a first stage of a shift register in which each intermediate stage is preceded and followed by a respective intermediate multiplexer.*

*operating said imtermediate multiplexers to connect all of said stages in series, and*

*during one half period of a word transmission duration, operating a plurality of transfer gates, which are each connected to receive the output of a respective one of said stages, to provide successive values, through a common line and an additional register which operates at twice said bit rate, to an output multiplexer, and operating said output multiplexer to provide said successive values as output, and*

*during the other half period of a word transmission duration, operating said output multiplexer to provide fill bits as output; and*

*for halving the bit rate:*

*connecting the incoming signal to said common line while inhibiting said transfer gates, and operating each said intermediate multiplexers to transfer into a respective one of said stages, in a predetermined order, either*

*bits of said incoming signal, from said common line or from said additional register, or*

*the output from a preceding one of said stages; and*

*operating said output multiplexer to provide said successive outputs from a last one of said stages as output.*

*14. The method of claim 13 for doubling the rate if 8-bit strings of data, using 5 of said stages.*

*15. The method of claim 13, for doubling the rate of N-bit strings of data where N is a predetermined even number, using 1+N/2 of said stages.*

*16. The method of claim 13, for doubling the rate of N–bit strings of data where N is a predetermined odd number, using 1+(N−1)/2 of said stages.*

*17. The method of claim 13, wherein each said transfer gate is a 3-state buffer.*

* * * * *

UNITED STATES PATENT AND TRADEMARK OFFICE

CERTIFICATE OF CORRECTION

PATENT NO. : Re. 35,254

DATED : May 28, 1996

INVENTOR(S) : Chaisemartin et al.

It is certified that error appears in the above-indentified patent and that said Letters Patent is hereby corrected as shown below:

On title page, item [73] should read as follows:

Assignee: SGS-Thomson Microelectronics, S.A.
Gentilly Cedex, France

Signed and Sealed this

Twelfth Day of November, 1996

*Attest:*

Bruce Lehman

BRUCE LEHMAN

*Attesting Officer*

*Commissioner of Patents and Trademarks*